United States Patent [19]

Tsuge et al.

[11] Patent Number: 4,537,169
[45] Date of Patent: Aug. 27, 1985

[54] FUEL INJECTION DEVICE OF DIESEL ENGINE

[75] Inventors: Noboru Tsuge, Kariya; Masahiro Taguchi, Okazaki; Masanori Kato, Toyoake; Satosi Kuwakado, Aichi, all of Japan

[73] Assignee: Nippon Soken, Inc., Nishio, Japan

[21] Appl. No.: 499,401

[22] Filed: May 31, 1983

[30] Foreign Application Priority Data

May 31, 1982 [JP] Japan .................. 57-91363

[51] Int. Cl.³ ............................ F02M 51/00
[52] U.S. Cl. ..................... 123/325; 123/493
[58] Field of Search ........... 123/325, 332, 333, 340, 123/341, 493

[56] References Cited

U.S. PATENT DOCUMENTS

| | | | |
|---|---|---|---|
| 3,794,003 | 2/1974 | Reddy | 123/325 |
| 3,906,207 | 9/1975 | Rivere et al. | 123/493 |
| 3,906,909 | 9/1975 | Garcea | 123/325 |
| 3,943,892 | 3/1976 | Brinkman | 123/325 |
| 4,207,845 | 6/1980 | Semmler | 123/325 |
| 4,391,243 | 7/1983 | Bessho | 123/493 |
| 4,434,759 | 3/1984 | Iezuka et al. | 123/493 |
| 4,466,413 | 8/1984 | Oonishi et al. | 123/493 |

Primary Examiner—William A. Cuchlinski, Jr.
Attorney, Agent, or Firm—Cushman, Darby & Cushman

[57] ABSTRACT

A fuel injection device of a diesel engine which stops fuel injection and throttles intake air during engine braking so that engine vibration, noise, harmful exhaust gas, and fuel consumption are all reduced. The device includes an intake valve interlocked with an accelerator to throttle intake air during accelerator nonoperation, sensors for detecting an engine braking condition, and a computer for controlling fuel injection in response to signals from engine sensors.

3 Claims, 2 Drawing Figures

FUEL INJECTION DEVICE OF DIESEL ENGINE

BACKGROUND OF THE INVENTION

1. Field of the Invention

The present invention relates to a fuel injection device of a diesel engine, more particularly, to a fuel injection device adapted to a diesel engine having an intake air throttling valve in an intake side of the engine.

2. Description of the Prior Art

In fuel injection devices of diesel engines, one known method for stopping the fuel supply comprises cutting off the fuel when the engine has stopped by operating a key switch to actuate a solenoid valve and shut a fuel passage. Another known method comprises reducing the fuel injection quantity to zero by the centrifugal force of a flyweight when the engine exceeds a predetermined rotational speed during no-load running. These methods thus help prevent engine damage.

Diesel engines involve higher compressive forces compared with gasoline engines and, therefore, have greater vibration and noise. Attempts have been made to reduce the vibration and noise of diesel engines by throttling the intake air and reducing the compressive force. This, however, results in poorer combustion and, thus, reduced output and greater harmful exhaust gas. Because of this, it has been proposed to throttle the intake air only during engine idling when there would be little effect on the output. Throttling of the intake air, however, is not easy during engine braking since the engine speed undergoes a large change. There has yet to be proposed an effective method which prevents increased harmful exhaust gas due to poorer combustion and which reduces vibration and noise under such an engine operating condition.

SUMMARY OF THE INVENTION

The present invention was made to solve the above-mentioned problem in fuel injection devices of diesel engines.

The object of the present invention is to provide, for a diesel engine with an intake air throttling valve in the engine intake side, a fuel injection device which can cut off fuel injection during engine braking and reduce engine vibration, noise, harmful exhaust gas, and fuel consumption.

According to the present invention, there is provided a fuel injection device of a diesel engine comprising a fuel injection nozzle, a fuel injection pump, a control means for the fuel injection pump, and an intake air throttling valve interlocked with an accelerator so as to throttle the intake air during accelerator nonoperation. The device is characterized in that there are provided a means for detecting engine braking and a means for controlling the fuel injection by signals from the detecting means so as to interrupt fuel injection during engine braking.

According to one aspect of the present invention, the detecting means comprises a sensor detecting the accelerator position, a sensor detecting the engine speed, and a sensor detecting the vehicle speed.

According to another aspect of the present invention, the detecting means comprises a pressure sensor detecting negative suction pressure downstream of the intake air throttling valve.

According to the present invention, a diesel engine with an intake air throttling means is provided with a means for detecting engine braking and a means for controlling the fuel injection by signals from the detecting means to interrupt fuel injection during the engine braking. This prevents fuel combustion during engine braking and, thereby, reduces engine vibration, noise, unburnt exhaust gas and fuel consumption. The engine braking detecting means and the intake air throttling means are used jointly. Therefore, even when the compressive force in the engine compression stroke is reduced by the intake air throttling operation so as to reduce engine vibration and noise, no unburnt exhaust gas due to poor combustion is discharged, because the fuel injection is cut off at the same time.

DESCRIPTION OF THE PREFERRED EMBODIMENTS

Figure 1:
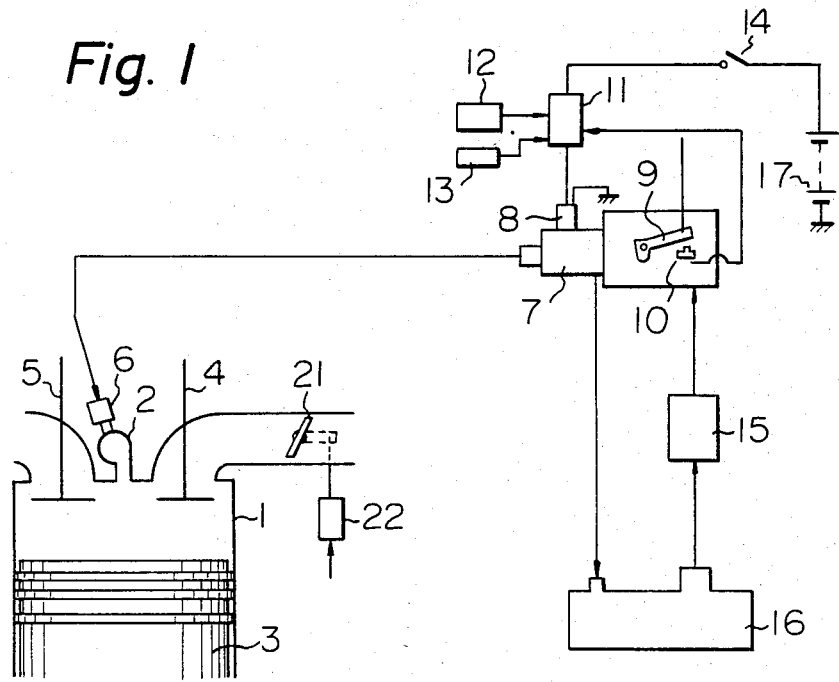
FIG. 1 is a system view of a first embodiment of the present invention.

A first preferred embodiment of the present invention will now be explained in reference to FIG. 1. In FIG. 1, reference numeral 1 represents a diesel engine body, 2 a turbulence chamber, 3 a piston, 4 an intake valve, 5 an exhaust valve, and 6 a fuel injection nozzle. Reference numeral 7 represents a fuel pump, and 8 a solenoid valve opening or shutting an entrance passage of a plunger of the fuel injection pump 7. Reference numeral 9 represents a fuel control lever. This lever 9 controls the fuel injection and is connected with an accelerator pedal (not shown).

Reference numeral 10 represents an accelerator position sensor. This sensor operates to issue a signal when the accelerator pedal is not depressed. Reference numeral 11 represents a computer, 12 an engine speed sensor, and 13 a vehicle speed sensor. The signals from sensors 10, 12, and 13 are transferred to the computer 11 for control of the supply of electricity to the solenoid valve 8.

Reference numeral 14 represents a key switch, 15 a fuel filter, 16 a fuel tank, and 17 a battery. Reference numeral 21 represents an intake air throttling valve. This valve 21 is connected with an actuator 22. The actuator 22 is adapted to operate by signals from the accelerator position sensor 10.

The operation of the first embodiment will now be described. During engine idling, an "accelerator nonoperating" signal is input into the computer 11. Since the vehicle speed sensor 13 detects zero speed, the computer 11 supplies electricity to the solenoid valve 8, fuel is injected into the diesel engine from the injection nozzle 6, and the engine rotates normally.

At this time, the "accelerator nonoperating" signal causes the actuator 22 to operate the intake air throttling valve 21 to shut nearly completely, and the intake air to be throttled.

During engine braking, the "accelerator nonoperating" signal from the accelerator position sensor 10, the "over predetermined speed" signal from the vehicle speed sensor 13, and the "higher than idling speed" signal from the engine speed sensor are all issued at once. Thus, engine braking is detected, and the computer 11 cuts off the electricity to the solenoid valve 8. This cuts off the fuel supply to the plunger of the fuel injection pump 7 and stops the ejection of fuel from the injection nozzle 6.

At this time, the "accelerator nonoperating" signal causes intake air throttling, but, since the fuel injection is stopped, no unburnt exhaust gas is discharged.

That is to say, when both the engine speed and vehicle speed are over predetermined levels and the accelerator pedal is not depressed even if the fuel supply is cut off, the engine continues its normal rotation due to its own inertia. When the engine speed and vehicle speed then decline to the predetermined levels, since the sensors detect that the engine is not in the braking condition, the fuel supply is restarted and engine rotation by normal combustion is continued.

The above operation reduces engine vibration and noise while the drive is off, and also reduces fuel consumption, and cuts off the discharge of unburnt exhaust gas.

Figure 2:
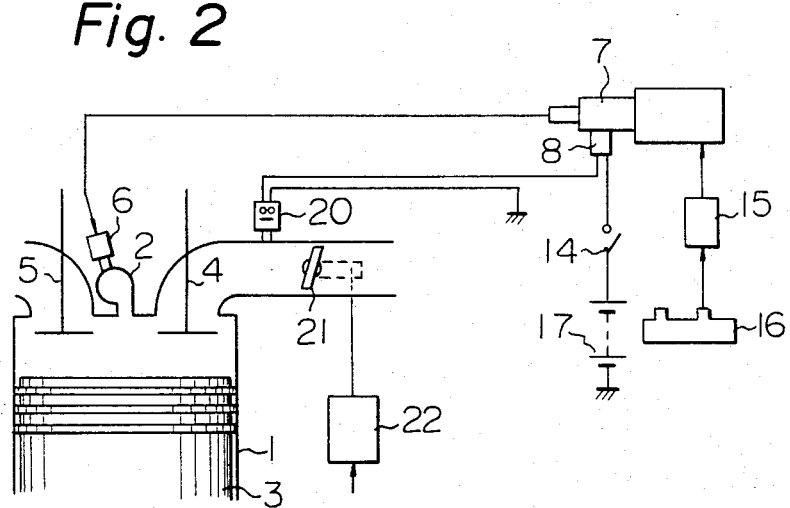
FIG. 2 is a system view of a second embodiment of the present invention.

A second preferred embodiment of the present invention is shown in FIG. 2. The difference between the second embodiment and the first is that the means for detecting engine braking comprises not three sensors, i.e., the accelerator position sensor 10, engine speed sensor 12, and vehicle speed sensor 13, but a pressure sensor 20 detecting the negative suction pressure downstream of the intake air throttling valve 21. Electricity to the solenoid valve 8 is turned on or off by signals from the pressure sensor 20.

In the operation of this embodiment, during engine idling, the actuator 22 operates by the "accelerator nonoperating" signal from an accelerator position sensor (not shown), the intake air throttling valve 21 located in the intake pipe is shut nearly completely, and engine vibration and noise are reduced by intake air throttling.

Generally, during engine braking, since the engine speed does not immediately decrease even if the accelerator pedal is not depressed, the negative pressure downstream of the intake air throttling valve 21 becomes large and intake air is throttled too much. As a result, the fuel combustion in the engine becomes poorer and unburnt exhaust gas occurs.

However, in this embodiment, the pressure sensor 20 quickly detects any increase over the predetermined negative pressure, the solenoid valve 8 is made off, the fuel supply to the plunger is cut, and the fuel injection from the injection nozzle 6 is interrupted. Thus, unburnt exhaust gas is cut off completely. As a result, fuel consumption as well as engine vibration and noise are reduced.

In both embodiments, the intake air throttling valves are constituted so as to open or shut by the actuators. However, they may be connected with the accelerator pedal directly.

We claim:

1. A fuel injection device of a diesel engine comprising;
   a fuel injection nozzle;
   a fuel injection pump;
   a control means for the fuel injection pump; and
   an intake air throttling valve interlocked with an accelerator so as to throttle the intake air during accelerator nonoperation;
   characterized in that there are provided:
   a means for detecting engine braking and
   a means for controlling fuel injection by signals from said detecting means, so that fuel injection is interrupted during engine braking where the accelerator does not operate and vehicle speed and engine speed exceed a predetermined speed.

2. A fuel injection device of a diesel engine according to claim 1, wherein the means for detecting engine braking comprises:
   a sensor for detecting the accelerator position;
   a sensor for detecting the engine speed; and
   a sensor for detecting the vehicle speed.

3. A fuel injection device of a diesel engine comprising;
   a fuel injection nozzle;
   a fuel injection pump;
   a control means for the fuel injection pump; and
   an intake air throttling valve interlocked with an accelerator so as to throttle the intake air during accelerator nonoperation;
   a means for detecting engine braking by means of a pressure sensor for detecting negative suction pressure downstream of the intake air throttling valve; and
   a means for controlling fuel injection by signals form said detecting means, so that fuel injection is interrupted during engine braking where the accelerator does not operate and vehicle speed and engine speed exceed a predetermined speed.

* * * * *